Jan. 5, 1932.    J. D. ELDER    1,839,209
MOLD FOR MAKING CORK SLABS
Filed April 12, 1928
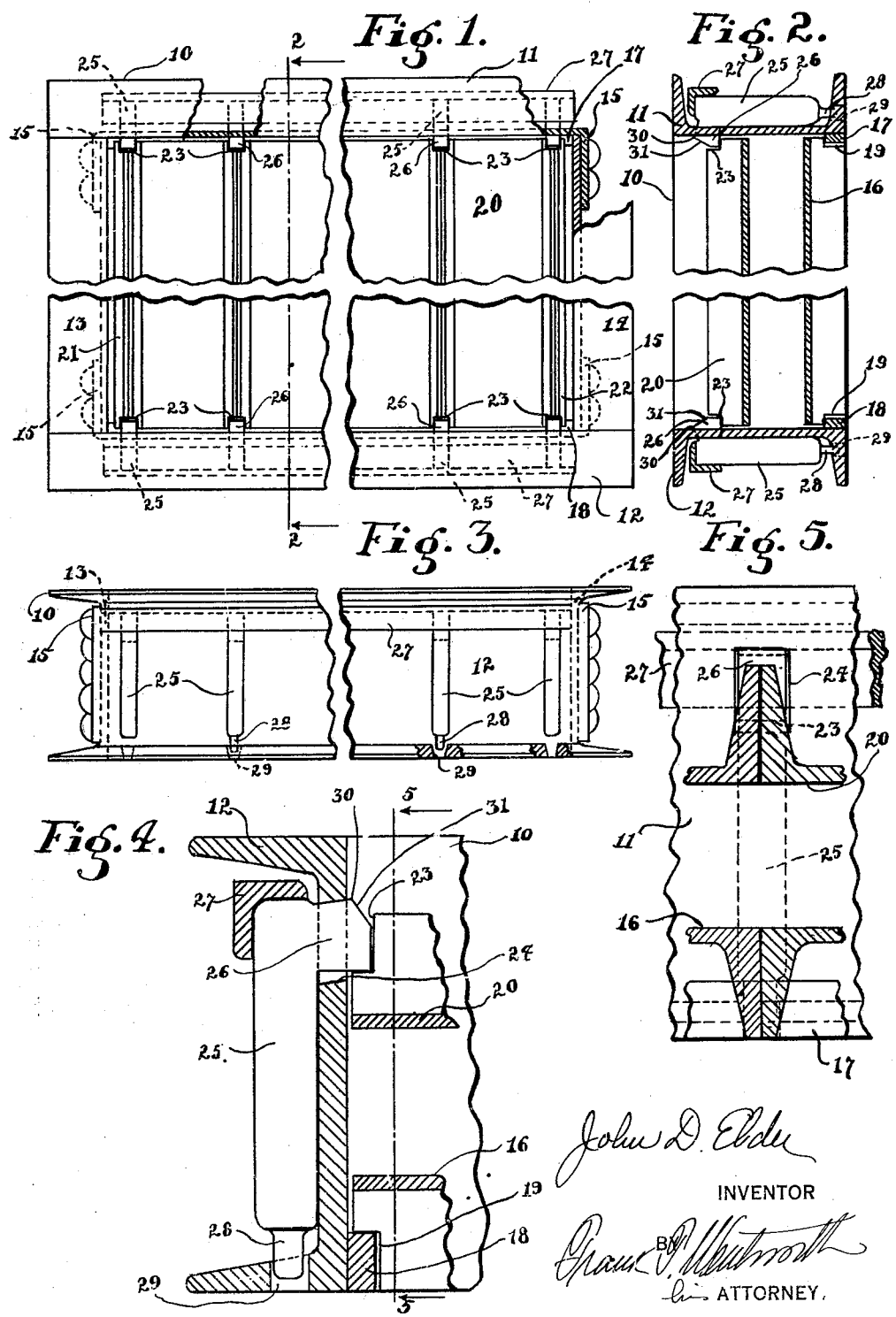

Patented Jan. 5, 1932

1,839,209

UNITED STATES PATENT OFFICE

JOHN D. ELDER, OF CATONSVILLE, MARYLAND, ASSIGNOR TO CROWN CORK & SEAL COMPANY, INC., OF NEW YORK, N. Y., A CORPORATION OF NEW YORK

MOLD FOR MAKING CORK SLABS

Application filed April 12, 1928. Serial No. 269,357.

My invention relates to molds for making cork slabs, and more particularly to a type of mold employing closure means for confining the compacted cork composition within certain limits during the setting of the binding medium, which closure means is removable from the mold during the drawing operations and is positioned in the mold during the compaction of the mass of cork composition.

In the production of slabs of composition cork, metallic molds are used, the cavity of each of which ordinarily has dimensions which will result in the production of a slab between two and three inches in thickness, and having a surface area, as to the maximum surface area, of about eighteen by thirty inches. Ordinarily the cork composition is subjected, while in the mold, to an elevated temperature for a time interval sufficient to ensure the proper conditioning and setting of the binder or adhesive used. This time interval will vary according to the binder used and the dimensions of the slab, but will ordinarily be from one to three hours or more and, notwithstanding this long time interval, the production of the slabs is a practically continuous operation employing a large number of molds, the time interval per unit of production being measured by the time required for either packing the mold or drawing the finished slab therefrom.

In the production of cork slabs, it has long been the practice to subject the cork composition to pressure from the packing machine through the closure member, which was secured in position in the mold while the contents were held under pressure by means of pins or screw bolts, a sufficient number of such being used to hold the closure means against displacement with the expansion of the compressed cork composition, either resulting from the relieving of the pressure upon the mass of cork, or from the application of heat while the mold and its contents were in the baker or vulcanizer. The use of a number of such pins or bolts required not only great nicety in the functioning of the packing machine, but a considerable length of time even though two men worked upon each machine; which is the factory practice with packing machines in which the mold is charged through an ingate approximating the thickness of a slab with a succession of charges each of which is separately packed by means of a plunger mechanism. With such molds the pins or bolts need be of a length of from four to five inches. With packing machines in which a single measured charge of cork composition is delivered to a mold and compacted by means of an hydraulic ram, the head of which is substantially of the same dimension as the largest area of the slab, the use of pins or bolts is prohibitive because the large number of such which would be required, would so limit the output of a machine as to make the commercial production of slabs impossible.

A mold embodying my invention includes therein a locking mechanism especially adapted for use with molds of the latter type. When hundreds of molds are required in connection with machinery for the production of cork slabs, it is essential that such molds be so constructed as to not only withstand the high pressures used in connection therewith, but each mold must be substantially identical with every other mold. The construction must be such as to not only facilitate the handling of the mold when charging and compacting the cork composition therein, but the closing of the mold and the maintenance of a fixed relation of parts during the baking or vulcanizing operation and the drawing of the finished slab therefrom.

With the above conditions in mind, I have produced a mold in which the top closure may be locked in relation to the mold body by members having a hinged relation to said body, and are so positioned at all times as to facilitate their engagement with or disengagement from the closure cover upon the completion of the packing operation or immediately preceding the drawing operation. These locking members may be so spaced as to avoid any bulging of said cover from the expansion of material within them notwithstanding its reinforcement to resist such, and may be arranged in gangs simultaneously operable for the purpose of expediting the locking or unlocking of the mold and thus permitting an increase in the production of slabs with a given machinery unit. The expansion stresses to which a mold of this kind is subjected are great, and it is desirable to so construct and arrange the locking members and the parts of the mold body co-operating therewith, as to ensure all of such stresses taken up by said locking members, being transferred to the walls of the mold body. This feature also permits the utilization of the expansive force of the cork composition for securing a positive locking action of said members which will preclude any possibility of their disengagement from the closure at any time excepting when the mold is to be opened to permit the drawing of a slab therefrom.

The mold itself is so constructed as to not only permit the locking mechanism above referred to to be used in conjunction therewith, but to give it the desired rigidity throughout, to permit a close uniform finish of the various parts of which the mold is composed and to facilitate the operations of packing the mold and drawing the slabs therefrom by means of automatic machinery.

The invention consists primarily in a mold for making cork slabs embodying therein a mold body having a cavity therein, a closure therefor having a free sliding fit within said cavity and having recessed portions at the top of opposite sides thereof, and a locking mechanism comprising a plurality of hooked members pivotally mounted exteriorly of said mold body so as to be movable into or out of engagement with the recessed portions of the top of said closure, said mold body having openings therethrough through which the hooked ends of said members may pass into or out of engagement with said closure; and in such other novel features of construction and combination of parts as are hereinafter set forth and described, and more particularly pointed out in the claims hereto appended.

Referring to the drawings,

Fig. 1 is a condensed plan view of a mold embodying my invention with portions thereof broken away;

Fig. 2 is a section on the line 2—2 of Fig. 1;

Fig. 3 is a condensed side view thereof;

Fig. 4 is a sectional view upon a larger scale through one side wall of the mold; and Fig. 5 is a section on the line 5—5 of Fig. 4 through a fragmentary portion of the mold.

Like numerals refer to like parts throughout the several views.

In the accompanying drawings, the invention is illustrated in connection with a mold of the type in which a full charge of cork composition is charged into the mold cavity at a single operation and compacted, also at a single operation, by means of an hydraulic ram, the pressure being applied through the closure means and throughout an area corresponding with that of the greatest dimension of the slab to be produced, approximately 550 square inches. When thus compacting the cork composition in the mold, the bulk of the charge will be condensed to a space within one-third to one-half of its original bulk, thus not only requiring great strength throughout the mold structure to withstand the compacting pressure, but great rigidity in the top and the bottom of the mold to transmit and resist this pressure and to withstand the expansive force of the compacted mass, particularly before the adhesive or binder therein has become properly set.

In the accompanying drawings, the mold body 10 consists of a shell having channelled metal sides 11 and 12 and channelled ends 13 and 14, these parts being secured together by riveting, welding or any other desired expedient for connecting turned ends 15 of the side channels 11 and 12 with the bottom of the end channels 13 and 14, the bending of the ends 15 being permitted by separating the bottom of the channel from the side webs thereof. The faces of all channels presented inwardly of the mold body, are brought to a fine finish, and when rivets are used, the heads thereof within the mold, must be finished flush with the adjacent portions of the channel. The whole inner face of this mold body is brought to a smooth, bright finish to facilitate the drawing of the finished cork composition slabs therefrom.

With this construction of mold, the bottom closure 16 thereof is adapted to have a free sliding fit within the mold body, being held against displacement outwardly thereof by means of cleats 17 and 18 extending along opposite sides of the mold body and secured thereto by welding or in any other desired manner.

This bottom closure is composed of a sequence of sections of channeled metal placed side by side with the abutting side webs of adjoining channels secured together, preferably by welding methods. Each of the channel pieces is an exact replica of the other, thus permitting the outer faces of the side webs and the outer face of the bottom of each channel to be brought to an accurate finish by grinding or other desired methods, so that when a number of the channel units are assembled, they may be so closely fitted as to leave no seam between these sections and will have the faces of all sections in a smooth plane.

To secure additional rigidity in the support of the bottom closure 16, the side webs of the channels of which this closure is constructed are cut away or recessed at the ends 19, as shown more particularly in Figs. 2 and 4, so as to bring the tops of the side webs of the closure channels substantially flush with the outer face of the adjacent webs of the side and end channels, and support the closure 16 by the engagement of the webs of the channels composing same, at a point fairly close to adjacent the bottom of the channels with the cleats 17 and 18, which also extend to a point substantially flush with the side webs of the side and end channels of the mold body. This bottom closure, having a free sliding fit within the mold cavity, not only permits the expulsion of air during the compacting operation, but also facilitates the drawing of the slab by the movement of the bottom closure within the mold cavity.

By the construction above described, great rigidity is imparted to the bottom closure, by the side webs of the adjoining channels which are connected in pairs in a manner to resist distortion of the bottom of the channels when pressure is applied by the ram to the contents of the mold, in compacting the charge, or when applying pressure to the completed slab through this movable bottom closure in drawing or ejecting the completed slab.

The top closure is, in its construction, an exact replica of the bottom closure, including the recessed ends of the webs of the channels. This top closure is indicated at 20.

In order to secure uniformity in the stiffening webs throughout both closures, the exterior webs of the end channel thereof have secured thereto metallic reinforcements such as 21—22 corresponding in construction with one of the webs of a channel, it being highly desirable to make the end reinforcing webs of the closure of a strength at least equal to that of any of the other webs. The end recesses in the webs of the closure 20 are indicated at 23, see Figs. 2 and 4 of the drawings. The end recesses 23 constitute means carried by the top closure with which the locking members, to be hereinafter referred to, co-operate when the mold is closed. By forming this means upon the webs upon the channels forming the closure 20, the desired rigidity of the closure at the points of engagement of the locking means therewith is secured.

By running the channels forming both the top and bottom closures a distance corresponding with the shortest dimension of the top of the mold cavity, and positioning the cleats 17 and 18 and the locking means so as to engage the opposite ends of the webs of these channels, the maximum rigidity is secured.

The depth of the body of the mold is such as to accommodate cork composition of sufficient bulk so that the compaction of the composition will form a slab of the desired thickness. The compaction is effected by placing the top closure 20 in position above the mold cavity and applying pressure, preferably by an hydraulic ram, to the contents of the mold through said top closure, the degree of compaction being slightly greater than that required to secure the desired thickness of the slab, in order to facilitate the engagement of the locking means with the top closure for the purpose of holding the mass under compaction. To permit the engagement of the locking means with said closure, openings 24 are provided through the opposite walls of the channels 11 and 12, preferably closely adjacent the top webs of these channels, said openings 24 preferably corresponding in number with the re-inforcing webs of the top closure at the opposite ends of each of these webs.

Pivotally mounted exteriorly of the body of the mold, are a plurality of hooked locking members 25, one adjacent each opening 24, the hooked end 26 of each locking member being adapted to pass through an opening 24 and enter an end recess 23 in engaging relation with the reinforcing webs of the top closure.

Preferably all of the members 25 are connected by means of an angle bar 27 in order to secure simultaneous movement of all of said members at either side of the mold, when either locking or unlocking the mold.

In order to ensure these locking members 25 being maintained in the proper engagement with the top closure from the time that the locking means are set until they are disengaged from the top closure preparatory to the drawing of the slab from the mold, they, in addition to their pivotal movement, have a vertical sliding movement, and the hooked ends thereof are so formed that, with such sliding movement, they will interlock with the sides of the mold body and be positively held against either oscillatory or reciprocatory movement until pressure is applied to the top closure inwardly of the mold cavity to an extent to permit such interlock to be broken by the automatic descent of the locking means with such downward movement of this closure.

To permit the pivotal and sliding movements above referred to, I provide one or more of the locking members 25 with pintles 28 adapted to enter openings 29 in the lower web of the side channels 11 or 12, the length of this pintle being such as to prevent its disengagement from said side web under normal working conditions.

The bottom web of each channel 11 or 12 is pierced so as to form openings in substantially the same vertical plane as the various reinforcing webs upon the top closure 20. This, however, is merely for the purpose of standardizing the parts for manufacturing purposes and to permit the use of the angle bar 27 or not, as desired. By forming the pintles 28 upon one end of the members 25, great simplicity of construction is secured, but other expedients for securing the same operative effect may be employed.

When the angle bar 27 is used, it is customary to have only two of the members 25 on each side of the mold provided with these pintles, although this is not essential.

In order to facilitate the handling of the mold, the dimensions of the various members 25 are such as to bring them entirely within the space between the webs of the channel bars 11 or 12.

To secure the interlocking effect above referred to, the upper edge of the hook 26 is inclined at 30, as shown more particularly in Fig. 4 of the drawings, the upper wall of the opening 24 being similarly inclined. The vertical dimensions of said opening 24 exceed those of the height of the hook 26 to an extent to permit the said hook to pass freely from said opening when the member 25 is in its lowermost position.

The upper portion of the hook 26 is preferably bevelled as shown at 31, so that in the event of the hooks being positioned inwardly of the mold cavity prior to the compacting operation, the engagement of the closure 20 therewith will force said hooks outwardly to allow proper clearance for the free downward movement of said closure.

It is not essential to incline the lower wall of each opening 24 as shown, this being a mere manufacturing expedient to simplify the formation of this opening.

The angle bar 27 is used in order to transmit the pressure applied to one of the members 25 to all of said members for either closing or opening the mold, but other means may be substituted for this angle bar either as a part of the mold or as a part of the machines in connection with which the mold is used.

The conditions in and the manner of handling the molds embodying the invention are substantially as follows:—

In describing this operation, I will consider briefly the entire procedure of making a cork slab when employing large, open-top molds of the description shown in the drawings. The mold is positioned upon a support beneath a mechanism for delivering the cork composition thereto, the horizontal shoulder of the recessed portion 19 of the bottom closure 16 at opposite ends of the reinforcing webs resting upon the cleats 17 and 18 respectively. Sufficient cork composition is then delivered into the mold cavity, the bulk thereof being such as to substantially fill same to or above the level of the top webs of the channel bars forming the body of the mold. While some composition cork may escape through the openings 24, the loss will not be appreciable, as the highest point of the charge will be centrally, and the lowest point at the sides of the mold.

The top closure 20 is then placed on top of the charge within the mold, being fitted within the mold cavity. The mold is then moved into position with relation to an hydraulic ram, the head of which will engage some, preferably all, of the reinforcing webs of the channel bars forming the top closure 20 as a continuing pressure is applied. This pressure continues until the horizontal shoulders of the recesses 23 of the reinforcing webs of the top closure are in substantial alinement with the bottom of the openings 24 through the walls of the sides of the body of the mold.

While the parts are in this position, the operator, or the machine, imparts pivotal movement to the various locking members 25. When hand operated, the angle bar 27 will ensure simultaneous movement of all of these locking members. The movement of said members will require practically no effort on the part of the operator when such are manually actuated.

This operation should occur just preceding the relieving of the pressure upon the top closure 20. When this pressure is relieved, the cork composition within the mold will substantially instantly expand, imparting upward movement to the closure 20, and therethrough to the various members 25. This upward movement will engage the inclined portion 30 of each hook 26 with the inclined top of its openings 24, thus not only checking further expansion of the cork composition within the mold, but preventing subsequent oscillatory movement of the members 25. In this manner the closure 20 is positively locked in relation to the mold body, and will remain so locked during the baking or vulcanizing of the contents of the mold.

The employment of a plurality of members 25 spaced along the channel bars 11 and 12 will prevent any appreciable yielding of the closure due partly to the number and arrangement of said members 25, and partly to the number and arrangement of the reinforcing webs of the channel metal forming this closure. The members 25 co-operate with the reinforced portions of the top closure, preferably at opposite ends of the shorter dimension of the larger surface of the slab being formed.

The locking members 25 being, when in the locked position, contained in their entirety within the top and bottom webs of the channel members 11 and 12, will permit the standing of these molds upon edge, as shown in Fig. 2, when and if desired.

The bulk of the metal in both the top and the bottom closure, and the relation of these parts in their construction will facilitate the application of the vulcanizing or baking heat to the mold contents, and will hold the cork composition against expansion as a whole, thus utilizing such expansion for readjusting the cork granules and securing substantial uniformity in density throughout the slab.

The mold, when drawing the completed slab therefrom, is positioned flatwise in relation to a double acting ram, the first action of which is to place a top pressure upon the closure 20, thus depressing it to an extent to bring the horizontal shoulders of the recesses 23, and the various locking members 25, to a level which will disengage the inclined portion 30 of said members from the tops of the openings 24. These locking members are then moved away from the mold body and the top pressure is relieved. Bottom pressure is then applied, forcing the bottom closure 16 upwardly, and with it, the completed product and the top closure. When the inner face of the bottom closure is at or above the top of the mold body, the slab and top closure are slid from the bottom closure, and the ejecting mechanism restored to its normal position.

The reinforcing webs on the bottom closure do not pass from the mold cavity, thus always maintaining this closure in a proper relation to said body.

The clearance between the edges of the top and bottom closures and the walls of the mold cavity not only compensate for expansion of these parts while in the oven, baker or vulcanizer, but ensures a continued free sliding fit of the mold parts and affords vents for the escape of air and gases during the compacting and baking operations.

A mold embodying my invention avoids any limitation upon the speed of operation of other mechanisms utilized in the production of cork slabs, by reason of the necessity for firmly holding the top cover of the mold immediately following the compaction of the cork composition, and for releasing the cover immediately prior to the drawing of the finished slab.

It is not my intention to limit the invention to the precise details of construction shown in the drawings, it being apparent that such may be varied without departing from the spirit and scope of the invention.

Having described the invention, what I claim as new and desire to have protected by Letters Patent, is:—

1. A mold for making cork slabs embodying therein a mold body having a cavity therein, a closure therefor having a free sliding fit within said cavity and having recessed portions at the top of opposite sides thereof, and a locking mechanism comprising a plurality of hooked members pivotally mounted exteriorly of said mold body so as to be movable into or out of engagement with the recessed portions of the top of said closure, said mold body having openings therethrough through which the hooked ends of said members may pass into or out of engagement with said closure.

2. A mold for making cork slabs embodying therein a mold body formed of a shell open at the top and at the bottom, top and bottom closures slidably mounted within said shell, means holding said bottom closure against displacement outwardly of the shell, said top closure having recessed portions at the top of opposite sides thereof, and a locking mechanism comprising a plurality of hooked members pivotally mounted exteriorly of said shell and movable into or out of engagement with the recessed portions of the top of said top closure, said shell having openings therethrough through which the hooked ends of said members may pass into or out of engagement with said top closure.

3. A mold for making cork slabs embodying therein a mold body having a cavity therein, a closure therefor having a free sliding fit within said cavity, and a locking mechanism comprising a plurality of hooked members pivotally and slidably mounted exteriorly of said mold body so as to be movable into or out of engagement with the top of said closure and be capable of limited movement with said closure upon the expansion of the contents of the mold, said mold body having openings therethrough through which the hooked ends of said members may pass into or out of engagement with said closure.

4. A mold for making cork slabs embodying therein a mold body having a cavity therein, a closure therefor having a free sliding fit within said cavity, and a locking mechanism comprising a plurality of hooked members pivotally and slidably mounted exteriorly of said mold body so as to be movable into or out of engagement with the top of said closure and be capable of limited movement with said closure upon the expansion of the contents of the mold, said mold body having openings therethrough through which the hooked ends of said members may pass into or out of engagement with said closure, and a bar connecting all of said hooked members, whereby simultaneous movement may be imparted thereto when closing or opening the mold.

5. A mold for making cork slabs embodying therein a mold body having a cavity therein, a closure therefor having a free sliding fit within said cavity, and a locking mechanism comprising a plurality of hooked members pivotally and slidably mounted exteriorly of said mold body so as to be movable into or out of engagement with the top of said closure and be capable of limited movement with said closure upon the expansion of the contents of the mold, said mold body having openings therethrough through which the hooked ends of said members may pass into or out of engagement with said closure, the upper wall of said openings being inclined toward said mold cavity, and said hooks having a similarly inclined top, whereby the interlocking of said hooks and said mold body results from the expansion of material within said cavity.

6. A mold for making cork slabs embodying therein a mold body having a cavity therein, a closure therefor having a free sliding fit within said cavity, and a locking mechanism comprising a plurality of hooked members pivotally and slidably mounted exteriorly of said mold body so as to be movable into or out of engagement with the top of said closure and be capable of limited movement with said closure upon the expansion of the contents of the mold, said mold body having openings therethrough through which the hooked ends of said members may pass into or out of engagement with said closure, and a bar connecting all of said hooked members, whereby simultaneous movement may be imparted thereto when closing or opening the mold, the upper wall of said openings being inclined toward said mold cavity, and said hooks having a similarly inclined top, whereby the interlocking of said hooks and said mold body results from the expansion of material within said cavity.

7. A mold for making cork slabs embodying therein a mold body having a cavity therein, a closure therefor composed of a sequence of sections of channelled metal placed side by side and secured together, said closure having a free sliding fit within said cavity, and a locking mechanism comprising a plurality of hooked members pivotally mounted exteriorly of said mold body so as to be movable into or out of engagement with the flanges of the channels forming said closure, said mold body having openings therethrough through which the hooked ends of said members may pass into or out of engagement with said closure, said flanges being recessed to receive said hooked members.

8. A mold for making cork slabs embodying therein a mold body formed of a shell open at the top and at the bottom, cleats within said shell adjacent the bottom thereof, a bottom closure composed of a sequence of sections of channelled metal placed side by side and secured together, the abutting flanges having recesses therein to receive and engage said cleats and bring said flanges substantially flush with the bottom of said shell, a top closure, said closures respectively having a free sliding fit within said shell, and a locking mechanism comprising a plurality of hooked members pivotally mounted exteriorly of said shell and movable into or out of engagement with the top of said top closure, said shell having openings therethrough through which the hooked ends of said members may pass into or out of engagement with said top closure.

9. A mold for making cork slabs embodying therein a mold body formed of a shell open at the top and at the bottom, cleats within said shell adjacent the bottom thereof, a bottom closure composed of a sequence of sections of channelled metal placed side by side and secured together, the abutting flanges having recesses therein to receive and engage said cleats and bring said flanges substantially flush with the bottom of said shell, a top closure composed of a sequence of sections of channelled metal placed side by side and secured together, the abutting flanges having recesses therein, said closures respectively having a free sliding fit within said shell, and a locking mechanism comprising a plurality of hooked members pivotally mounted exteriorly of said shell and movable into or out of engagement with the top of said top closure, said shell having openings therethrough through which the hooked ends of said members may pass into or out of engagement with the recessed portion of the flanges of said top closure.

10. A mold for making cork slabs embodying therein a mold body formed of a shell open at the top and at the bottom, cleats within said shell adjacent the bottom thereof, a bottom closure composed of a sequence of sections of channelled metal placed side by side and secured together, the abutting flanges having recesses therein to receive and engage said cleats and bring said flanges substantially flush with the bottom of said shell, a top closure composed of a sequence of sections of channelled metal placed side by side and secured together, the abutting flanges having recesses therein, said closures respectively having a free sliding fit within said shell, and a locking mechanism comprising a plurality of hooked members pivotally and slidably mounted exteriorly of said shell so as to be moved into or out of engaging relation with the recessed flanges of said top closure and be capable of limited movement with said closure upon the expansion of the contents of the mold, said shell having openings therethrough through which the hooked ends of said members may pass into or out of engagement with said flanges, and a bar connecting all of said hooked members, whereby simultaneous movement may be imparted thereto when closing or opening the mold, the upper wall of said openings being inclined inwardly of said shell, and said hooks having a similarly inclined top, whereby the interlocking of said hooks and said shell results from the expansion of material within said shell.

11. A mold for making cork slabs embodying therein a mold body consisting of a shell having channelled metal sides and channelled ends secured together, top and bottom closures slidably mounted within said shell, means holding said bottom closure against displacement outwardly of the shell, and a locking mechanism comprising a plurality of hooked members pivotally and slidably mounted exteriorly of said shell and within the channel forming same, whereby said members may be moved into or out of engagement with the top of said top closure and be capable of limited movement with said closure upon the expansion of the contents of the shell, said shell having openings therethrough through which the hooked ends of said members may pass into or out of engagement with said closure.

12. A mold for making cork slabs embodying therein a mold body consisting of a shell having channelled metal sides and channelled ends secured together, cleats within said shell adjacent the bottom thereof, a bottom closure composed of a sequence of sections of channelled metal placed side by side and secured together, the abutting flanges having recesses therein to receive and engage said cleats and bring said flanges substantially flush with the bottom of said shell, a top closure composed of a sequence of sections of channelled metal placed side by side and secured together, the abutting flanges having recesses therein, said closures respectively having a free sliding fit within said shell, and a locking mechanism comprising a plurality of hooked members pivotally and slidably mounted exteriorly of said shell so as to be moved into or out of engaging relation with the recessed flanges of said top closure and be capable of limited movement with said closure upon the expansion of the contents of the mold, said shell having openings therethrough through which the hooked ends of said members may pass into or out of engagement with said flanges, and a bar connecting all of said hooked members, whereby simultaneous movement may be imparted thereto when closing or opening the mold, the upper wall of said openings being inclined inwardly of said shell, and said hooks having a similarly inclined top, and a bevelled end, whereby the interlocking of said hooks and said shell results from the expansion of material within said shell, and said hooks may be forced outwardly of said shell.

In witness whereof I have hereunto affixed my signature this 9th day of April 1928.

JOHN D. ELDER.